US010630862B2

(12) United States Patent
Andersen et al.

(10) Patent No.: US 10,630,862 B2
(45) Date of Patent: Apr. 21, 2020

(54) TRANSPARENT PLATEN WITH CHAMFERED EGRESS EDGE

(71) Applicant: Hewlett-Packard Development Company, L.P., Spring, TX (US)

(72) Inventors: Eric Andersen, Boise, ID (US); Ryan M Smith, San Diego, CA (US); Shannon Lai, San Diego, CA (US); Jennifer Waskow, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/329,874

(22) PCT Filed: Sep. 8, 2016

(86) PCT No.: PCT/US2016/050764
§ 371 (c)(1),
(2) Date: Mar. 1, 2019

(87) PCT Pub. No.: WO2018/048405
PCT Pub. Date: Mar. 15, 2018

(65) Prior Publication Data
US 2019/0245999 A1    Aug. 8, 2019

(51) Int. Cl.
*H04N 1/028* (2006.01)
*H04N 1/12* (2006.01)
*H04N 1/00* (2006.01)

(52) U.S. Cl.
CPC ....... *H04N 1/1235* (2013.01); *H04N 1/00994* (2013.01); *H04N 1/02815* (2013.01)

(58) Field of Classification Search
CPC ............... H04N 1/4076; H04N 1/0057; H04N 1/00588; H04N 1/00591; H04N 1/00596; H04N 1/00615; H04N 1/1017; H04N 1/1061; H04N 1/1065; H04N 1/12; H04N 2201/0434; H04N 2201/044; H04N 1/0311; H04N 1/0312; H04N 1/0315;
(Continued)

(56) References Cited

U.S. PATENT DOCUMENTS 4,769,852 A      9/1988   Hashimoto et al.
5,847,846 A  *  12/1998   Wu ........................ G03G 15/04
                                                            358/475
(Continued)

FOREIGN PATENT DOCUMENTS

CN         1324177        11/2001
CN         2622780         6/2004
(Continued)

*Primary Examiner* — Negussie Worku
(74) *Attorney, Agent, or Firm* — Trop, Rea, Bentley & Kim LLC

(57) ABSTRACT

In one example, an apparatus includes a transparent platen to receive a document to be scanned. The transparent platen includes a scan line, an ingress edge positioned prior to the scan line in the document path, and a chamfered egress edge positioned subsequent to the document path. A light source is positioned to illuminate the document with light while the document passes across the scan line, and a focusing mechanism is positioned to focus a portion of the light that is reflected by the document onto a sensor that senses the portion of the light.

15 Claims, 5 Drawing Sheets

(58) Field of Classification Search
CPC ......... H04N 1/121; H04N 2201/02495; H04N 2201/03133; H04N 2201/0317; H04N 2201/03183
USPC ........ 358/474, 496, 497, 1.9, 471, 483, 487, 358/498, 504; 271/227; 382/275, 315, 382/318
See application file for complete search history.

(56) References Cited

U.S. PATENT DOCUMENTS

| | | | | |
|---|---|---|---|---|
| 5,895,928 | A * | 4/1999 | Kerschner | H04N 1/00681 250/559.37 |
| 6,154,294 | A * | 11/2000 | Craig | H04N 1/0311 358/483 |
| 6,856,423 | B2 | 2/2005 | Anderson et al. | |
| 7,733,538 | B2 * | 6/2010 | Kanesaka | G03B 27/62 250/208.1 |
| 7,898,702 | B2 | 3/2011 | Hill et al. | |
| 8,368,976 | B2 | 2/2013 | Hsu | |
| 8,395,827 | B2 | 3/2013 | Sheng et al. | |
| 8,659,802 | B2 | 2/2014 | Ikeno et al. | |
| 8,780,421 | B2 | 7/2014 | Nakanishi et al. | |
| 8,964,261 | B2 | 2/2015 | Hyun | |
| 9,843,692 | B2 * | 12/2017 | Katayama | H04N 1/0057 |
| 2002/0033968 | A1 * | 3/2002 | Chen | H04N 1/0057 358/406 |
| 2004/0080791 | A1 * | 4/2004 | Beck | H04N 1/00588 358/406 |
| 2004/0109207 | A1 * | 6/2004 | Mui | H04N 1/0057 358/498 |
| 2007/0043603 | A1 * | 2/2007 | Andersen | G06Q 10/06 705/7.14 |
| 2011/0096371 | A1 * | 4/2011 | Mui | H04N 1/203 358/474 |
| 2013/0038909 | A1 * | 2/2013 | Andersen | H04N 1/1017 358/296 |
| 2013/0308168 | A1 | 11/2013 | Yamada et al. | |
| 2017/0274160 | A1 * | 9/2017 | Mantell | A61M 13/003 |
| 2019/0217636 | A1 * | 7/2019 | Smith | B41J 11/006 |
| 2019/0245996 | A1 * | 8/2019 | Smith | H04N 1/00551 |

FOREIGN PATENT DOCUMENTS

| | | |
|---|---|---|
| CN | 205123844 | 3/2016 |
| JP | 2006211032 | 8/2006 |
| JP | 2010095343 A | 4/2010 |

\* cited by examiner

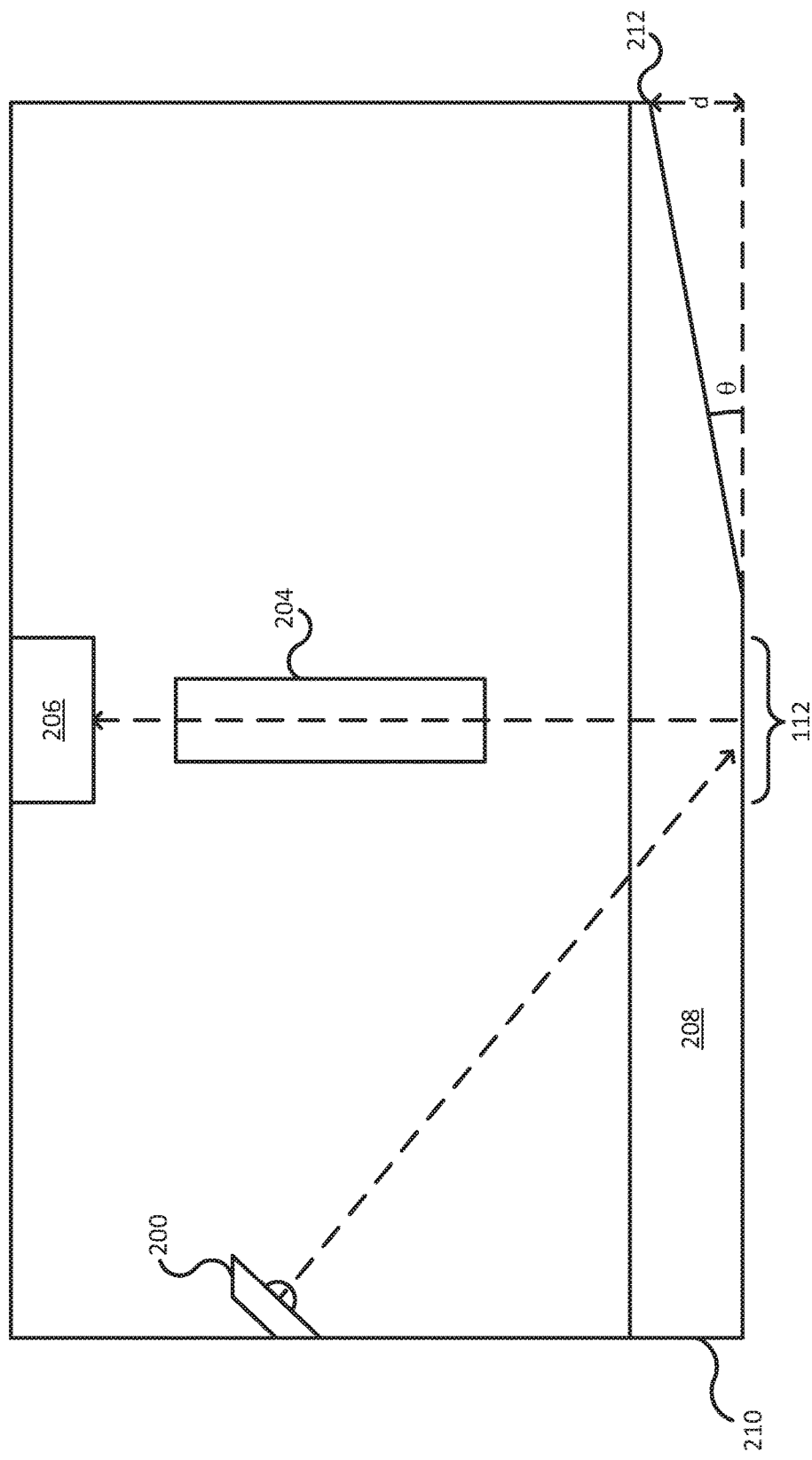

TRANSPARENT PLATEN WITH CHAMFERED EGRESS EDGE

BACKGROUND

Some scanning devices, including multifunction printers (MFPs) and other devices, are capable of reproducing two-sided documents. In some cases, these devices use two separate scanning modules to scan both sides of the document as it is fed through the automatic document feeder (ADF) of the device. In order to reduce the overall size of the device, the scanning modules may be positioned so that their respective scan lines are laterally offset from each other by a few millimeters, thereby shortening the paper path through the ADF.

BRIEF DESCRIPTION OF THE DRAWINGS

FIGS. 2A-2B illustrate more detailed schematic views of first and second examples, respectively, of the second scanning module of FIG. 1;

DETAILED DESCRIPTION

In one example, the present disclosure describes a contact image sensor (CIS) module including a scanning platen with a chamfered egress edge. As discussed above, some scanning devices that are capable of reproducing two-sided documents position two separate scanning modules so that their respective scan lines (e.g., focal points) are laterally offset from each other by a few millimeters. The document to be scanned then passes between the two scan lines, and each scanning module scans (along its respective scan line) one side of the document. This configuration shortens the paper path through the automatic document feeder (ADF) of the scanning device and reduces the overall device size. However, this configuration has also been shown to accumulate large amounts of dust and debris to the platen of the scanning module that scans the second (back) side of the document, particularly when that scanning module is a CIS module. This accumulation of dust and debris causes the appearance of undesirable streaks in the scanned image or printed copy of the document.

Examples of the present disclosure describe a contact image sensor module for scanning the second (back) side of a document, where the edge of the platen at the point of document egress (i.e., subsequent to the CIS scan line in the paper path) has a chamfered surface. In further examples, an electrostatic discharge (ESD) mechanism, such as an ESD brush, is positioned just beyond the point of egress in the paper path. In a further example still, the first (front) side reference label on the second side CIS module is narrowed such that a distance from the reference label to the second side CIS module's scan line is greater than half the distance between the scan lines of the first and second side scanning modules. These features in combination have been shown to dramatically reduce the buildup of dust and debris on the scan line of the CIS module used to scan the second side. The platen of the CIS module can thus be cleaned less often, resulting in less downtime for the scanning device.

Within the context of this disclosure, the "first" or "front" side of a document to be scanned is understood to be the side of the document that faces upward or outward (e.g., is visible) when the document is fed into an automatic document feeder of a scanning device. The "second" or "back" side of the document to be scanned is the side of the document that faces downward or inward (e.g., is not visible) when the document is fed into the ADF.

Figure 1:
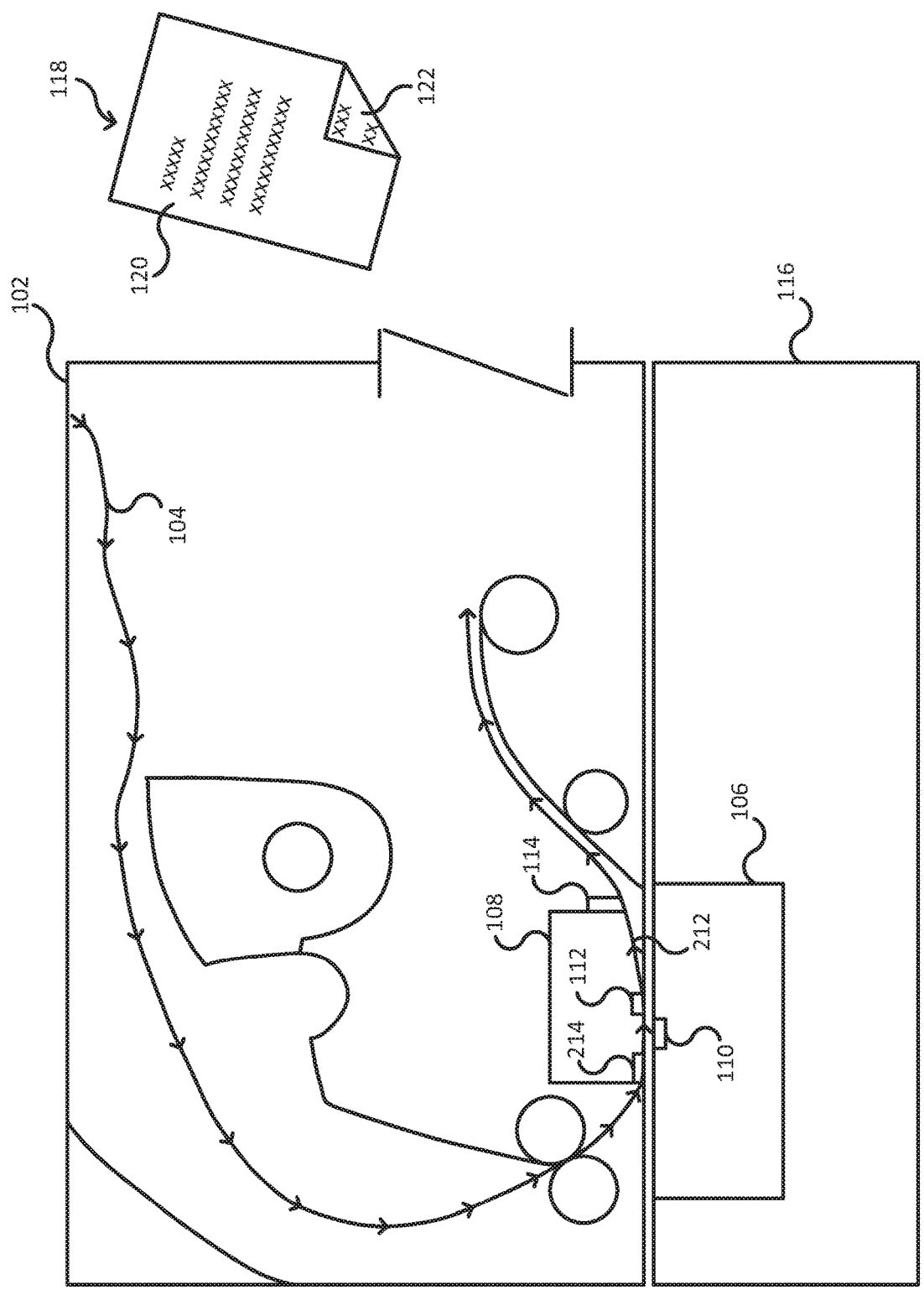
FIG. 1 illustrates a simplified cross sectional view of a portion of a scanning device of the present disclosure.

FIG. 1 illustrates a simplified cross sectional view of a portion of a scanning device 100 of the present disclosure. In one example, the scanning device 100 is attached to a printer, making it a multifunction printer (MFP); however, in other examples, the scanning device 100 may be a part of any device that incorporates an image sensor (CIS) module or modules, including a sheet feed scanner or flatbed duplex scanner. In one example, the scanning device 100 includes an automatic document feeder (ADF) 102 and a flatbed scanner 116. The ADF 102 feeds a document to be scanned into the paper path 104 that the document will follow through the scanning device 100, while the flatbed scanner 116 houses at least one scanning module for scanning the document. The paper path 104 will take the document to be scanned through and past various components of the scanning device 100, including components of the ADF 102 and components of the flatbed scanner 116. Although the path of the document is described herein as a "paper path," this does not limit the form of the document that may be processed by the scanning device 100. For instance, the scanning device 100 may be used to process documents comprising materials other than paper.

The scanning device 100 includes components configured to reproduce (e.g., in the form of a scanned image or a printed copy) a two-sided document 118. As illustrated, an example two-sided document 118 includes text or images on both a first side 120 and an opposite second side 122, where the first side 120 and the second side 122 may not be visible simultaneously when the document 118 lies flat. Thus, among other components which are not illustrated or described in detail, the scanning device 100 may include a first scanning module 106 and a second scanning module 108. As illustrated, the first scanning module 106 and the second scanning module 108 may be stacked so that the document to be scanned passes between them as it travels the paper path 104.

The first scanning module 106 comprises optics for scanning the first side 120 of the document 118 (i.e., the side of the document 118 that faces upward or outward when the document 118 is fed into the ADF 102). Thus, the first scanning module 106 may comprise a contact image sensor (CIS) module, a reduction optics module, or some other combination of optics. The first scanning module 106 comprises a first scan line 110 along which scanning of the first (e.g., front) side 120 of the document 118 is scanned.

The second scanning module 108 comprises optics for scanning the second side 122 of the document 118 (i.e., the side of the document 118 that faces downward or inward when the document 118 is fed into the ADF 102). In one example, the second scanning module 106 may comprise a CIS module as further illustrated in FIGS. 2A-2B. The second scanning module 108 comprises a second scan line 112 along which the second (e.g., back) side 122 of the document 118 is scanned.

As illustrated, the first scan line 110 and the second scan line 112 are laterally offset from each other in the paper path 104, so that the light emitted by the first scanning module 106 during scanning of the first side 120 of the document 118 does not interfere with scanning of the second side 122 of the document 118 by the second scanning module 108 (e.g., by bleeding through the document 118), and vice versa. In one example, the lateral offset between the first scan line 110 and the second scan line 112 is approximately ten millimeters. That is, there are approximately ten millimeters between the end of the first scan line 110 and the beginning of the second scan line 112 (where "end" and "beginning" are relative to the direction in which a document traverses the paper path 104).

Figure 2B:
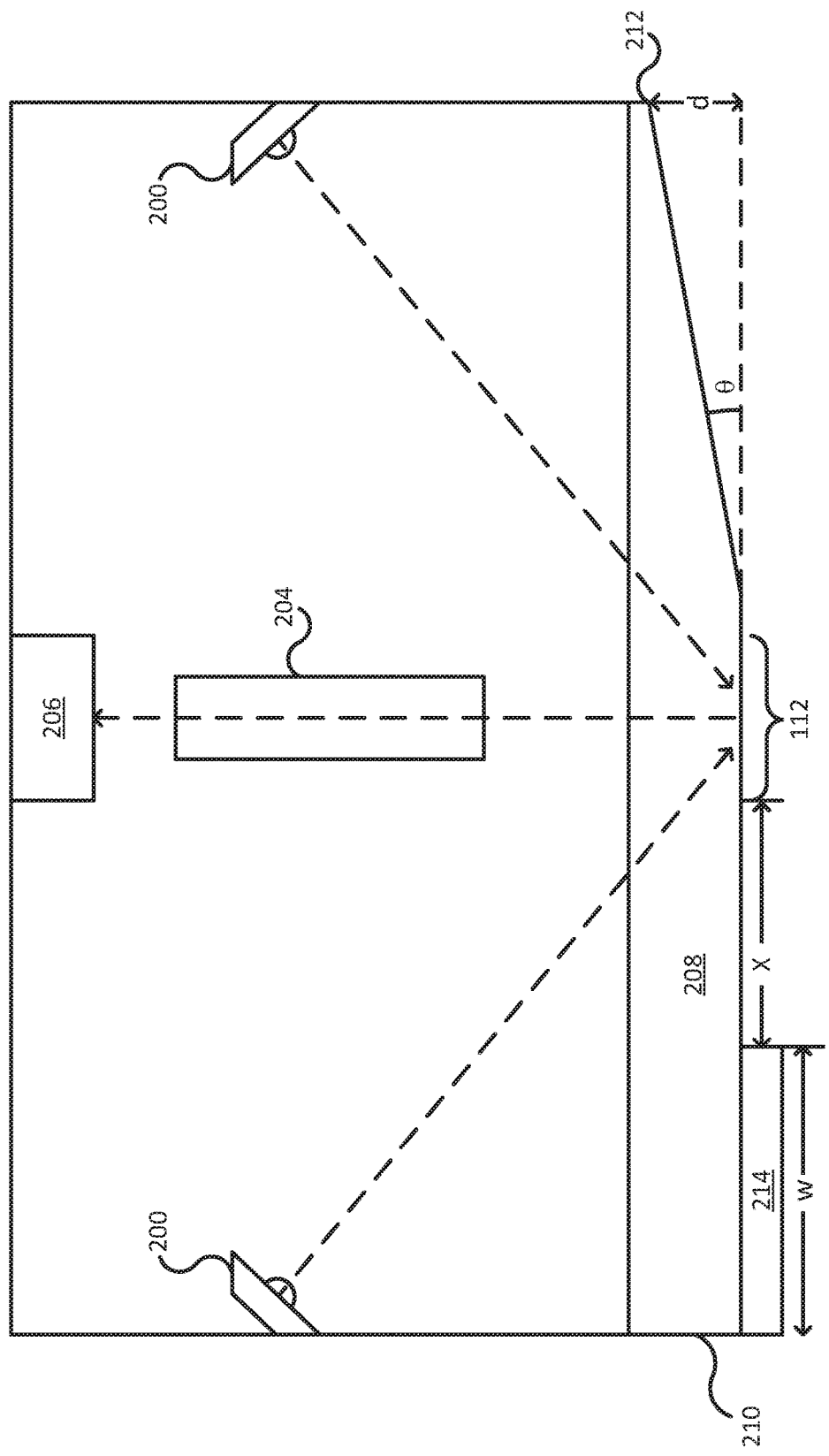

FIGS. 2A-2B illustrate more detailed schematic views of first and second examples, respectively, of the second scanning module 108 of FIG. 1. In particular, FIGS. 2A-2B illustrate the second scanning module 108 configured as a CIS module. In one example (e.g., where the first scanning module 106 is also configured as a CIS module), the first scanning module 106 may be configured in a substantially similar manner to the second scanning module 108 (e.g., may include a similar arrangement of optics). However, in such cases, the first scanning module 106 may omit components such as a chamfer on its transparent platen and a reference label.

With reference to both FIG. 2A and FIG. 2B, the second scanning module 108 generally comprises a light source 200, a focusing mechanism 204, a sensor 206, and a transparent platen 208.

The document 118 passes across the transparent platen 208 as it travels along the paper path 104 and encounters the scan line 112 of the second scanning module 108. In particular, the document 118 approaches the scan line 112 at an ingress edge 210 of the transparent platen 208 and moves away from the scan line 112 at an egress edge 212 of the transparent platen 208. Thus, the ingress edge 210 is positioned prior to the scan line 112 in the paper path 104, while the egress edge 212 is positioned subsequent to the scan line 112 in the paper path 104.

As illustrated, in one example, the egress edge 212 is chamfered along the length of the second scanning module 108 (i.e., along the dimension that goes into the page of FIGS. 2A-2B). In one example, the chamfer angle $\theta$ (i.e., the angle between the scan line 112 and the chamfered egress edge 212 of the transparent platen 208) is at least five degrees. In a further example, the chamfer angle $\theta$ is at least seven degrees. In one example, the chamfer begins at or near the edge of the scan line 112 and extends to the end of the transparent platen 208. In one example, the depth d of the chamfer is between 0.7 and 1.5 millimeters.

In one example, the transparent platen 208 may comprise any transparent material, such as glass or resin, which allows light to pass through.

The light source 200 is positioned to emit light in one or more directions that are incident upon the scan line 112 of the second scanning module 108. As such, when the document 118 passes across the scan line 112, a portion of the light emitted by the light source 200 passes through the transparent platen 208 and is reflected by the document 118 (e.g., specifically by the second side 122 of the document 118). In one example, the light source 200 comprises at least one light guide having a red light emitting diode (LED), a green LED, and a blue LED mounted at one end. For instance, FIG. 2A illustrates an example where the light source 200 comprises a single light guide, while FIG. 2B illustrates an example where the light source 200 comprises two light guides. Where the light source 200 emits light from near the egress edge 212 of the second scanning module 108 as shown in FIG. 2B, the depth, angle, and length (e.g., where the chamfer starts and ends) of the chamfer of the egress edge 212 may be selected so as not to interfere with the path of the light to the scan line 112.

The focusing mechanism 204 is positioned to receive the portion of the light that is reflected by the document 118 and to focus this reflected light onto the sensor 206. In one example, the focusing mechanism 204 is a lens, such as a rod lens.

The sensor 206 is positioned to receive and detect the reflected light that is focused by the focusing mechanism 204. The image displayed on the second side 122 of document 118 can be reconstructed by further components of the scanning system 100 based on the reflected light that is detected by the sensor 206. In one example, the sensor 206 comprises a linear array of photodetectors.

In one example illustrated in FIG. 2B, the second scanning module 208 further comprises a reference label 214 positioned between the ingress edge 210 and the scan line 112. The reference label 214 is a label that may be used to calibrate the color and brightness of pixels in scanned lines of the document 118 that are scanned by the first scanning module 106, or to create a known color or geometric reference behind the document to be scanned. For instance, the reference label 214 may be a white label, or another kind of label that facilitates calibration or creation of a reference. In one example, the reference label 214 has a width, w, that is between five and seven millimeters. In one example, the distance x from the nearest edge of the scan line 112 (e.g., the "beginning" of the scan line 112) of the second scanning module 108 to the edge (e.g., the "end") of the reference label 214 is greater than half the lateral distance between the scan line 110 of the first scanning module 106 and the scan line 112 of the second scanning module 108 (e.g., between five and seven millimeters). In one example, for instance, the distance x is 6.43 millimeters.

Referring back to FIG. 1, an electrostatic discharge (ESD) mechanism 114, such as an ESD brush or other grounded object, is also positioned along the paper path 104, in a position that is immediately subsequent to the first scanning module 106 and the second scanning module 108 in the paper path 104 (i.e., near the egress edge 212 of the transparent platen 208). The ESD mechanism 114 removes from the document 118 any electrostatic charge, e.g., such as may result from physical contact with the platens of the first scanning module 106 and the second scanning module 108 or with other components of the scanning system 100.

In one example where the ESD mechanism 114 is an ESD brush, the ESD brush has relatively coarse strands or pitch. In one example, the ESD mechanism 114 is an ESD brush with a pitch of at least one millimeter.

The combination of the chamfered egress edge 212 on the transparent platen 208 of the second scanning module 108, the narrowed width w of the reference label 214 on the second scanning module 108, and the relocation of the ESD mechanism 114 to the egress edge 212 of the transparent platen 208 (along with the use of the coarser material and increased pitch of the brush) has been shown to dramatically reduce the buildup of dust on the transparent platen 208, and particularly along the scan line 112 of the second scanning module 108. In turn, the appearance of streaks in scanned images and printed copies of documents scanned by the scanning system 100 is minimized. For instance, experimental data has shown that when these features are implemented in combination, up to approximately 24,000 pages may be printed before at least one visually perceptible streak or at least one severe streak is observed. Thus, the transparent platen 208 of the second scanning module 108 may be cleaned less often, resulting in shorter and less frequent downtime for the scanning system 100.

Figure 3:
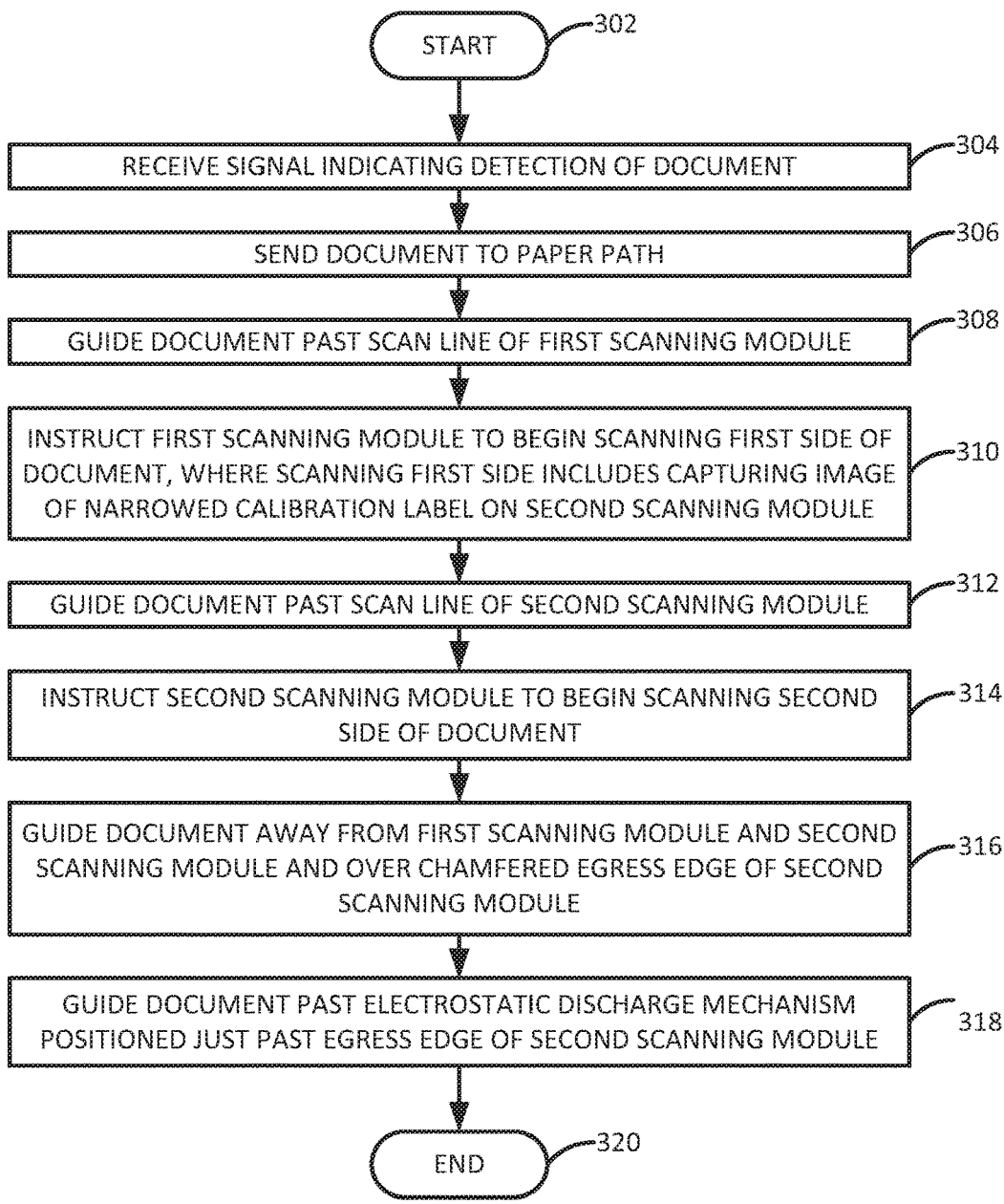
FIG. 3 is a flow diagram illustrating one example of a method for scanning a two-sided document.

FIG. 3 is a flow diagram illustrating one example of a method 300 for scanning a two-sided document, such as the two-sided document 118 of FIG. 1. The method 300 may be performed, for example, by a controller of the scanning device 100 of FIGS. 1 and 2A-2B. Alternatively, or in addition, at least one of the blocks of the method 300 may be implemented by a computing device having a processor, a memory, and input/output devices as illustrated below in FIG. 4, specifically programmed to perform the blocks of the method, e.g., by operating as a control circuit for the scanning device 100. Although a computing device may be specifically programmed to perform various blocks of the method 300, the method will now be described in terms of an example where blocks of the method are performed by a controller of a scanning device. As such, non-limiting reference is made in the discussion of the method 300 to various components of FIGS. 1 and 2A-2B. Moreover, although the method 300 assumes that a document to be scanned is a two-sided document (e.g., includes content on both sides), the scanning device 100 that is illustrated in FIGS. 1 and 2A-2B could also be used to scan one-sided documents (e.g., includes content on one side and is blank on the other side).

The method 300 begins in block 302. In block 304, the controller receives a signal from the automatic document feeder 102 indicating that the ADF has detected the presence of a document 118 in its tray. In one example, the document 118 is a two-sided document having images or text on both of its sides 120 and 122.

In block 306, the controller sends the document 118 to the paper path 104. In one example, sending the document 118 to the paper path 104 may comprise sending a signal to the ADF 102 instructing the ADF 102 to feed the document 118 into the paper path 104.

In block 308, the document 118 is guided past the scan line 110 of the first scanning module 106. In block 310, the controller sends a signal to the first scanning module 106 instructing the first scanning module 106 to begin scanning the first side 120 of the document 118, line-by-line. As discussed above, the first scanning module 106 may operate in a manner substantially similar to the second scanning module 108 and scan the first side 120 of the document 118 by first illuminating the scan line 110 and then detecting the light that is reflected by the first side 120 of the document 118. In one example, scanning of the first side 120 of the document 118 by the first scanning module 106 includes capturing an image of a narrowed reference label 214 (e.g., whose distance x to the nearest edge of the scan line 112 of the second scanning module 108 is greater than half the lateral distance between the scan line 110 of the first scanning module 106 and the scan line 112 of the second scanning module 108) on the second scanning module 108. Information from the captured image may help further components of the scanning system 100 to calibrate the color and brightness of pixels of scanned lines of the document 118.

In block 312, the document 118 is guided past the scan line 112 of the second scanning module 108. In block 314, the controller sends a signal to the second scanning module 108 instructing the second scanning module 108 to begin scanning the second side 122 of the document 118, line-by-line. As discussed above, the second scanning module 108 scans the second side 122 of the document 118 by first illuminating the scan line 112 and then detecting the light that is reflected by the second side 122 of the document 118.

In block 316, the controller guides the document 118 away from the first scanning module 106 and the second scanning module 108. In one example, as the document 118 is guided away from the first scanning module 106 and the second scanning module 108 after scanning, the document 118 passes over the chamfered egress edge 212 of the second scanning module 108. As discussed above, the egress edge 212 may have a chamfer angle θ of at least five to seven degrees and a depth d of between 0.7 and 1.5 millimeters.

In block 318, the controller guides the document 118 past the electrostatic discharge mechanism 114 that is positioned just past the egress edge 212 of the second scanning module 108. In one example, the ESD mechanism 114 is an ESD brush constructed from a relatively coarse material and having a pitch of at least one millimeter.

The method 300 ends in block 320. However, the controller may perform other functions after block 320 to guide the document 118 toward the end of the paper path 104 (and out of the scanning device 100) and/or to process the image data recorded by the first scanning module 106 and the second scanning module 108 to reproduce the document 118 as a scanned image or a printed copy.

Figure 4:
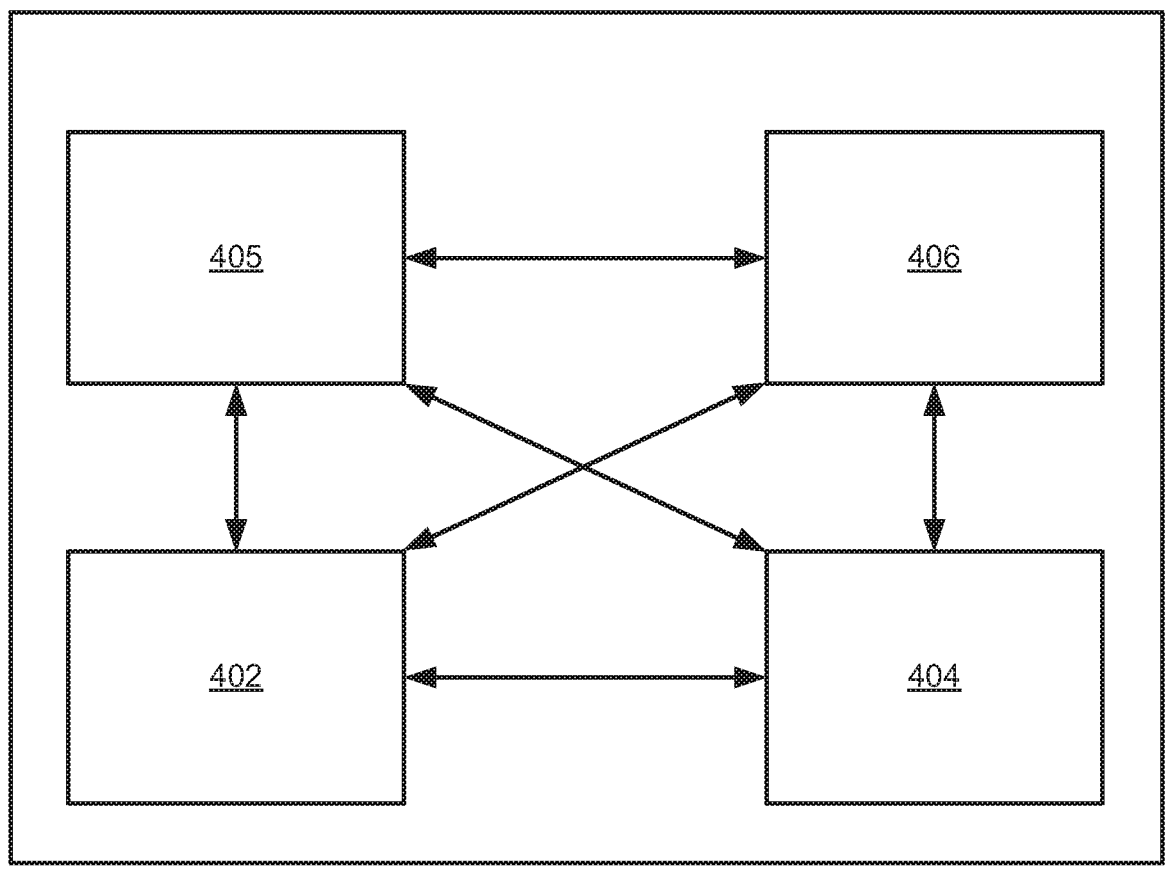
FIG. 4 depicts a high-level block diagram of a computing device suitable for use in performing the functions described herein.

FIG. 4 depicts a high-level block diagram of a computing device suitable for use in performing the functions described herein. As depicted in FIG. 4, the computing device 400 comprises a hardware processor element 402, e.g., a central processing unit (CPU), a microprocessor, or a multi-core processor, a memory 404, e.g., random access memory (RAM), a module 405 for scanning a two-sided document, and various input/output devices 406, e.g., storage devices, including but not limited to, a tape drive, a floppy drive, a hard disk drive or a compact disk drive, a receiver, a transmitter, a speaker, a display, a speech synthesizer, an output port, an input port and a user input device, such as a keyboard, a keypad, a mouse, a microphone, and the like. Although one processor element is shown, it should be noted that the general-purpose computer may employ a plurality of processor elements. Furthermore, although one general-purpose computer is shown in the figure, if the method(s) as discussed above is implemented in a distributed or parallel manner for a particular illustrative example, i.e., the blocks of the above method(s) or the entire method(s) are implemented across multiple or parallel general-purpose computers, then the general-purpose computer of this figure is intended to represent each of those multiple general-purpose computers.

It should be noted that the present disclosure can be implemented by machine readable instructions and/or in a combination of machine readable instructions and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the blocks, functions and/or operations of the above disclosed methods.

In one example, instructions and data for the present module or process 405 for scanning a two-sided document, e.g., machine readable instructions, can be loaded into memory 404 and executed by hardware processor element 402 to implement the blocks, functions, or operations as discussed above in connection with the example method 300. In this case, the module 405 for scanning a two-sided document may include code components or instructions. Furthermore, when a hardware processor executes instructions to perform "operations," this could include the hardware processor performing the operations directly and/or facilitating, directing, or cooperating with another hardware device or component, e.g., a co-processor and the like, to perform the operations.

The processor executing the machine readable instructions relating to the above described method(s) can be perceived as a programmed processor or a specialized processor. As such, the present module 405 for scanning a two-sided document, including associated data structures, of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, the computer-readable storage device may comprise any physical device or devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, or variations therein may be subsequently made, which are also intended to be encompassed by the following claims.

What is claimed is:

1. An apparatus, comprising:
    a transparent platen to receive a document to be scanned, the transparent platen including a scan line, wherein the transparent platen includes an ingress edge positioned prior to the scan line in a path of the document to be scanned and a chamfered egress edge positioned subsequent to the scan line in the path of the document to be scanned;
    a light source to illuminate the document to be scanned with light while the document to be scanned passes across the scan line;
    a focusing mechanism to focus a portion of the light that is reflected by the document to be scanned; and
    a sensor to sense the portion of the light that is reflected by the document to be scanned and focused by the focusing mechanism.

2. The apparatus of claim 1, wherein a chamfer angle of the chamfered egress edge is at least five degrees.

3. The apparatus of claim 1, wherein a chamfer depth of the chamfered egress edge is between 0.7 and 1.5 millimeters.

4. The apparatus of claim 1, wherein the chamfered egress edge begins at an edge of the scan line and extends to an end of the transparent platen.

5. The apparatus of claim 1, further comprising:
    a reference label positioned between the ingress edge and the scan line, wherein a distance from the scan line to a nearest edge of the reference label is greater than half a lateral distance between the scan line and a scan line of another apparatus with which the apparatus is stacked.

6. The apparatus of claim 5, wherein the width is between five and seven millimeters.

7. The apparatus of claim 5, wherein a distance from an edge of the reference label to an edge of the scan line is between five and seven millimeters.

8. The apparatus of claim 1, further comprising:
    an electrostatic discharge mechanism positioned immediately subsequent to the egress edge in the path of the document to be scanned.

9. The apparatus of claim 8, wherein the electrostatic discharge mechanism comprises an electrostatic discharge brush having a pitch of at least one millimeter.

10. The apparatus of claim 9, wherein the electrostatic discharge brush has coarse strands.

11. An apparatus, comprising:
    a transparent platen to receive a document to be scanned, the transparent platen including a scan line, wherein the transparent platen includes an ingress edge positioned prior to the scan line in a path of the document to be scanned and a chamfered egress edge positioned subsequent to the scan line in the path of the document to be scanned;
    a reference label positioned between the ingress edge and the scan line, wherein a distance from the scan line to a nearest edge of the reference label is greater than half a lateral distance between the scan line and a scan line of another apparatus with which the apparatus is stacked;
    an electrostatic discharge mechanism positioned immediately subsequent to the egress edge in the path of the document to be scanned;
    a light source to illuminate the document to be scanned with light while the document to be scanned passes across the scan line;
    a focusing mechanism to focus a portion of the light that is reflected by the document to be scanned; and
    a sensor to sense the portion of the light that is reflected by the document to be scanned and focused by the focusing mechanism.

12. The apparatus of claim 11, wherein the chamfered egress edge begins at an edge of the scan line and extends to an end of the transparent platen.

13. The apparatus of claim 11, wherein the electrostatic discharge brush has coarse strands and a pitch of at least one millimeter.

14. An apparatus, comprising:
    a first scanning module comprising a first scan line to scan a first side of a document; and
    a second scanning module positioned in a stacked arrangement with the first scanning module, the second scanning module comprising:
        a transparent platen to receive the document, the transparent platen including a second scan line to scan a second side of the document, the second scan line being laterally offset from the first scan line of the first scanning module, wherein the transparent platen includes:
            an ingress edge positioned prior to the second scan line in a path of the document; and
            a chamfered egress edge positioned subsequent to the second scan line in the path of the document; and
        an electrostatic discharge mechanism positioned immediately subsequent to the egress edge in the path of the document.

15. The apparatus of claim 14, wherein the second scanning module further comprises:
    a light source to illuminate the second side of the document with light while the document passes across the second scan line;
    a focusing mechanism to focus a portion of the light that is reflected by the second side of the document; and
    a sensor to sense the portion of the light that is reflected by the second side of the document and focused by the focusing mechanism.

* * * * *